United States Patent [19]

Raskin

[11] Patent Number: 4,677,862

[45] Date of Patent: Jul. 7, 1987

[54] EXTRUDED LOAD CELL

[76] Inventor: Seymour H. Raskin, P.O. Box 913, Rockwall, Tex. 75087

[21] Appl. No.: 912,156

[22] Filed: Sep. 24, 1986

Related U.S. Application Data

[60] Continuation of Ser. No. 543,247, Oct. 19, 1983, abandoned, Continuation-in-part of Ser. No. 202,460, Oct. 31, 1980, Pat. No. 4,420,985, which is a division of Ser. No. 37,133, May 8, 1979, abandoned.

[51] Int. Cl.$^4$ .............................................. G01L 1/22
[52] U.S. Cl. .............................. 73/862.65; 73/862.04; 73/862.63; 338/5
[58] Field of Search ........... 73/862.04, 862.62–862.66; 338/5

[56] References Cited

U.S. PATENT DOCUMENTS

| | | | |
|---|---|---|---|
| 2,472,047 | 5/1949 | Ruge | 73/862.65 X |
| 3,161,046 | 12/1964 | Farley | 73/862.15 |
| 3,427,875 | 2/1969 | Saxl | 73/862.04 |
| 3,837,222 | 9/1974 | Raskin | 73/862.62 |

FOREIGN PATENT DOCUMENTS

| | | | |
|---|---|---|---|
| 2129214 | 1/1973 | Fed. Rep. of Germany | 338/5 |
| 0446758 | 3/1968 | Switzerland | 73/862.65 |
| 0974519 | 11/1964 | United Kingdom | 73/862.65 |
| 0556354 | 4/1977 | U.S.S.R. | 73/862.65 |

Primary Examiner—Charles A. Ruehl
Attorney, Agent, or Firm—Crutsinger & Booth

[57] ABSTRACT

A force sensitive structural element comprising an extrusion of high strength aluminum alloy to which strain gages are attached and a base plate constructed of dissimilar material mounted in a housing. The height and coefficient of thermal expansion of the extruded member are selected relative to each of the height of the housing and coefficient of thermal expansion of the housing and the area of a resilient seal between the housing and a load carrying member attached to the extrusion. Variable magnitudes of expansion of the materials tends to collectively cancel the variation in barametric effects of thermal changes acting on the load cell.

20 Claims, 26 Drawing Figures

| WHEN APPLIED | OUTPUTS ARE | | | | |
|---|---|---|---|---|---|
| LOAD IS | TOTAL | 901b | 902b | 903b | 904b |
| $+P_y$ | +4 | +(T) | +(C) | +(C) | +(T) |
| $-P_y$ | -4 | -(C) | -(T) | -(T) | -(C) |
| $+P_z$ | 0 | +(T) | +(T) | -(T) | -(C) |
| $-P_z$ | 0 | -(C) | -(T) | +(T) | +(T) |
| $+P_x^*$ | 0 | 0 | 0 | 0 | 0 |
| $-P_x^*$ | 0 | 0 | 0 | 0 | 0 |
| $+Q_x$ | 0 | +(T) | +(C) | -(T) | -(C) |
| $-Q$ | 0 | -(C) | -(T) | +(C) | +(T) |
| $+Q_y^*$ | 0 | 0 | 0 | 0 | 0 |
| $-Q_y^*$ | 0 | 0 | 0 | 0 | 0 |
| $\pm Q_z$ | 0 | +(T) | -(T) | -(T) | +(T) |

T = TENSION ON GAGE
(*) = NEUTRAL AXIS IN BENDING

| | 910a | 910c | 911a | 911c |
|---|---|---|---|---|
| $+Q_y$ | +(T) | +(C) | +(C) | +(T) |
| $-Q_y$ | -(C) | -(T) | -(T) | -(C) |

| | TOTAL | 909c | 909a | 912a | 912c |
|---|---|---|---|---|---|
| $+P_x$ | +4 | +(T) | +(C) | +(C) | +(T) |
| $-P_x$ | -4 | -(C) | -(T) | -(T) | -(C) |

|  | | 901c | 904c | 904c | 901a |
|---|---|---|---|---|---|
| $+Q_x$ | +4 | +(T) | +(C) | +(C) | +(T) |
| $-Q_x$ | -4 | -(C) | -(T) | -(T) | -(C) |

|  | | 902c | 902a | 903a | 903c |
|---|---|---|---|---|---|
| $+Q_z$ | +4 | +(T) | +(C) | +(C) | +(T) |
| $-Q$ | -4 | -(C) | -(T) | -(T) | -(C) |
| $-P_x^*$ | | | | | |

|  | TOTAL | 913a | 914a | 914c | 913c |
|---|---|---|---|---|---|
| $+P_z$ | +4 | +(T) | +(C) | +(C) | +(T) |
| $-P_z$ | -4 | -(C) | -(T) | -(T) | -(C) |
| $\pm P_y^*$ | 0 | 0 | 0 | 0 | 0 |
| $\pm P_x^2$ | 0 | 0 | 0 | 0 | 0 |
| $\pm Q_x^3$ | 0 | 0 | 0 | 0 | 0 |
| $\pm Q_z$ | 0 | +(T) | -(T) | -(T) | +(T) |

(2) AT POINT OF INFLECTION FOR LATERAL BENDING IN Z-X PLANE (3) AT POINT OF INFLECTION FOR VERTICAL BENDING IN Z-Y PLANE

EXTRUDED LOAD CELL

CROSS REFERENCE TO RELATED APPLICATION

This is a continuation of application Ser. No. 543,247 filed 10/19/83, now abandoned, which is a continuation-in-part of my copending application Ser. No. 06/202,460, filed Oct. 31, 1980.

U.S. Pat. No. 4,420,985, which was a divisional of Ser. No. 37,133 (abandoned) filed May 8, 1979.

This invehtion relates to improvements in strain gage load cells, particularly to load cells of the type shown in my earlier U.S. Pat. Nos. 3,837,222, 4,262,763, and 4,385,527, and my co-pending application, Ser. No. 06/202,460.

In these devices, use of high strength aluminum alloy as the material in the force sensitive structure is desirable, but inability to readily weld high strength aluminum alloy requires that other means be found for rigid and stable connection between components which, in the case of steel structures, were readily welded together. The present invention provides for other means of welded assembly of load cell components, wherein dissimilar metals are used to take advantage of the relatively high elasticity of high strength aluminum alloy, such as 7075-T6 aluminum, and the more weldable character of steel or other grades of aluminum.

The increased complexity of the shape of aluminum alloy force sensitive structures increases the costs of fabrication and increases the risk of nonuniformity in terms of non-symmetry of structure, which nonuniformity could detrimentally affect side load rejection capability of the load cell. This invention provides improvement in design of extrusion dyes for producing long strips of relatively uniform and symmetrical cross section, so that uniform grain structure of the material is enhanced and symmetry is improved and requirements for final machining are dramatically reduced.

Use of dissimilar materials in load cell structures creates a need for addressing the relationship of stresses and strains created by changing thermal effects. This characteristic is found in conventional load cells, but is increased in dissimilar material load cells as the thermal changes cause a corresponding change of pressures acting on the material sealed within the load cell housing. The present invention provides a novel means of compensation for thermal changes.

Provision in this invention of novel means for thermal compensation requires a novel gasket means for protecting and sealing the load cell housing, so that the thermal effects of the gasket creates a deviation of sensed forces which compensates for other deviations caused by thermal defect on the structure.

DESCRIPTION OF THE DRAWING

Drawings of preferred embodiments of the invention are annexed hereto so that the invention may be better and more fully understood, in which:

Numeral references are employed to designate like parts throughout the various figures of the drawing.

FIG. 1 is a side elevation view of load element 1 having a top surface 2 capable of receiving an input of force and having bottom surface 3 capable of supporting element 1. Beam portions 4 and 5 extend horizontally outward from the central position of element 1, and the beam portions have upper surfaces 6 and 7 and lower surfaces 8 and 9. The said upper surfaces 6 and 7 lie in a common plane and are located at an elevation a distance h/2 above axis Z—Z. Lower surfaces 8 and 9 lie at an elevation spaced a distance h/2 below axis Z—Z, forming beam portions of depth h.

Figure 1:
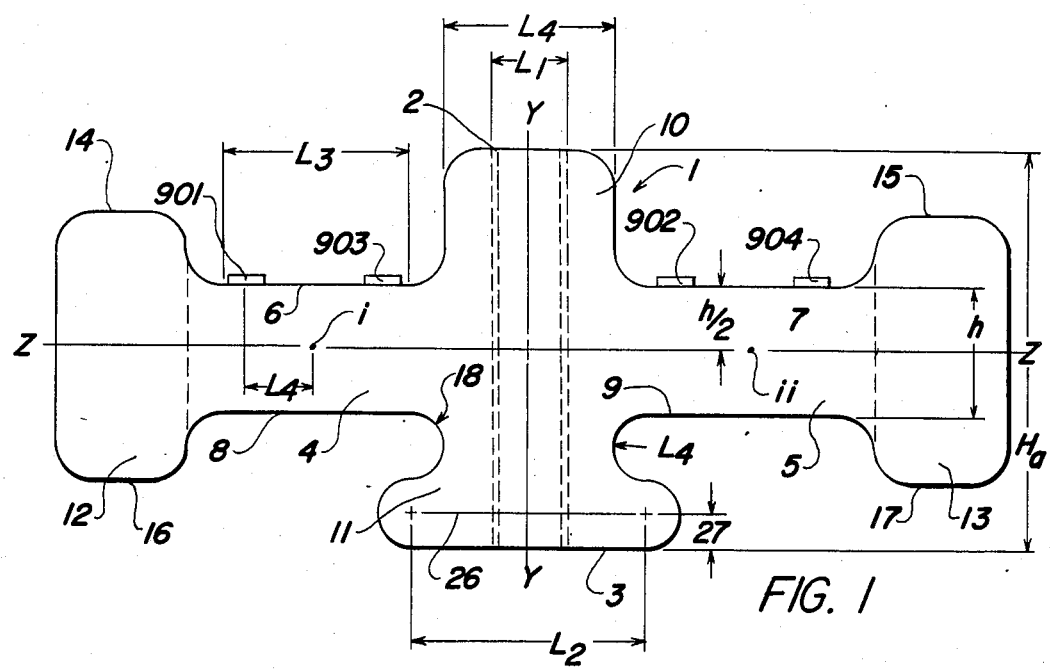
FIG. 1 is a side elevational view of a load element.

A vertically thickened upper central portion 10 and a vertically thickened lower central position 11 are disposed so that said top surface 2 and said bottom surface 3 are each at a distance from axis Z—Z which is greater than distance h/2, but the two surfaces 2 and 3 are not necessarily equidistant from axis Z—Z.

A thickened end portion 12 is disposed at the outer end of beam 4, and another thickened end portion 13 is at the outer end of beam 5. Upper surfaces 14 and 15 and lower surfaces 16 and 17 of end portions 12 and 13, respectively, are located distances greater than h/2 above and below axis Z—Z.

The length L1, of surface 2 is less than the length L2 of surface 3, so that applied vertical loads entering the structure on surface 2 will be inside the limits L2 of surface 3, and applied vertical loads will tend to stabilize, rather than topple or overturn, the structure.

Typical radius 18 may be uniform, as shown, for all radii shown in this FIG. 1, where the overall height of the load cell element is shown to be $H_a$.

Figure 2:
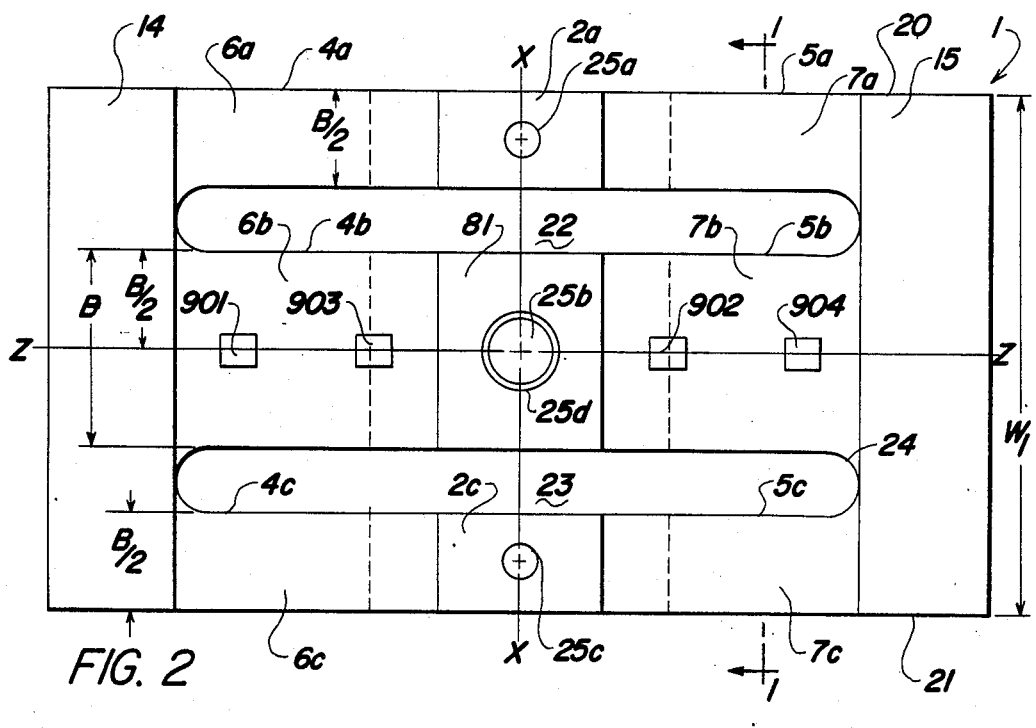
FIG. 2 is a top plan view thereof.

In FIG. 2, the load cell element 1 is shown in plan view, and it can be seen that side surfaces 20 and 21 are vertical and parallel to each other. Slots 22 and 23, having a typical radius 24 at each end, act to separate beam portions 4 and 5 into side beam portions 4a, 4c, 5a and 5c, and central beam portions 4b and 5b. The width of each of central beams portions 4b and 5b is equal to dimension B. The width of each of central beam portions 4b and 5b is equal to dimension B. The width of each of side beam portions 4a, 4c, 5a and 5c is one half of dimension B of central beam positions 4b and 5b.

It can be seen that gages 901, 902, 903 and 904 lie on the upper surfaces 6b and 7b of the beam portions 4b and 5b in locations which are directly above axis Z—Z. The functions of strain gages 901, 902, 903 and 904 are fully described in my co-pending application Ser. No. 06/202,460, and in my U.S. Pat. Nos. 4,262,763, issued Apr. 21, 1981, and 4,385,527, issued May 31, 1983. Further, the importance of having the neutral axis of the central beam portions 4b and 5b lie along axis Z—Z also is disclosed in the above cited art. As explained in the prior art, vertical bending of all of the beam portions 4a, b, c and 5a, b, c under vertically applied loads—introduced along the Y—Y axis—will cause bending of the beams so that maximum bending moments occur near the extremity of dimension $L_3$ and substantially no bending moments occur at points of inflection i and ii.

Holes 25a and 25c are provided to enable a tie-down of element 1 to a base structure and hole 25b with chamfer 25d is capable of receiving a central load post, as will be discussed later.

Figure 3:
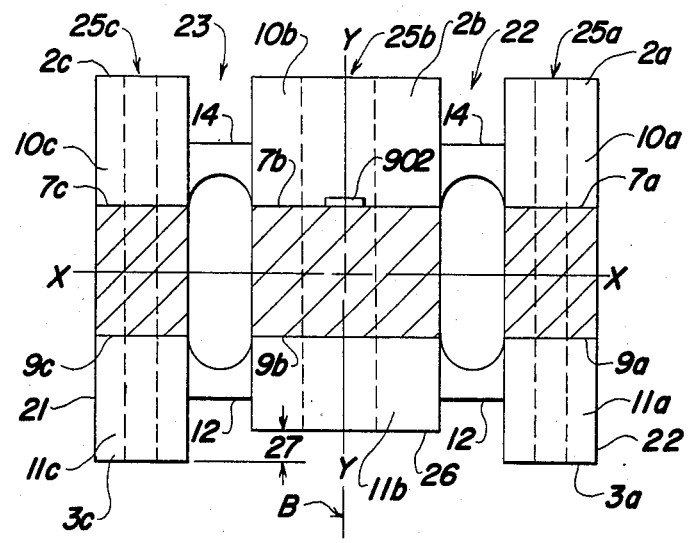
FIG. 3 is a cross sectional view taken along line A—A of FIG. 2.

FIG. 3 is a sectional view taken along A—A of FIG. 2, wherein is shown a bottom surface 26 of lower central thickened portion 11b, so that a clearance space 27 is created between the relative elevations of surface 26 and common surfaces 3a and 3c. Space 27 allows the central beam portions 4b and 5b and the upper and lower central thickened portions 10b and 11b to be vertically displaced under a vertical load condition, while surfaces 3a and 3c rigidly support the side structure as described in the cited prior art.

Figure 4:
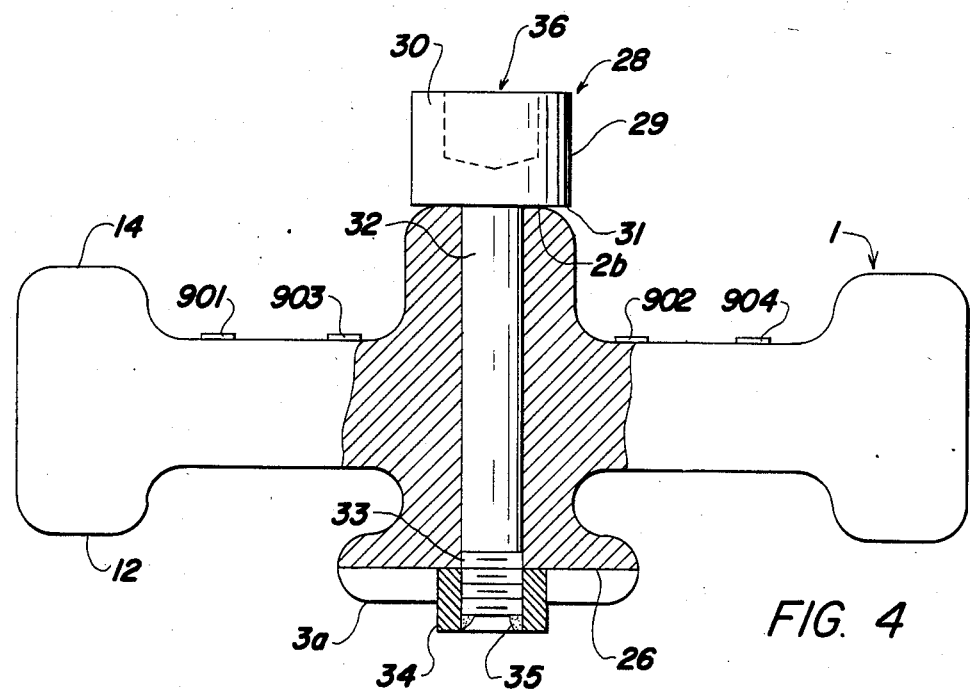
FIG. 4 is a side elevational view similar to FIG. 1, parts being broken away to illustrate a center post affixed to the load element.

In FIG. 4, a center post 28 is affixed to the load cell element. Cylindrical portion 29 has a load receiving surface 30 and a load transfer surface 31. Integral with cylindrical portion 30 is stem portion 32 which has a threaded end 33. A nut 34 anchors center post 28, and is shown welded to the end of stem 32 as by typical weld 35.

The welding at 35 serves a number of purposes. First, the assembly is welded and potential subsequent loosening of nut 34 is avoided. Also, for example, if the material of center post 28 and its integral members 29 and 32, as well as nut 34, are steel and if the material of load cell element 1 is aluminum, there would be no way to weld the steel post 28 directly to the aluminum element 1. Instead, I use the process of tightening nut 34 to the maximum torque allowed by threads 33, then applying a weld 35 to the internal vertical wall of nut 34 and horizontal end surface of stem 32. As the weld 35 cools and shrinks, it tends to pull stem 32 downward and nut 34 upward, creating a clamping action on element 1 to more tightly secure the nut 34, post 28 and element 1 to each other in a common, integral assembly. Clamping action as a result of the described weld shrinkage can utilize the full stress capability of the cross section of threads 33, and not be limited to stress capability of the threads alone.

It is this novel feature which permits the use of aluminum load cell elements with steel load receiving members, in order to utilize the best properties of each material. Aluminum beams in bending will generate, for example, 1,000 microstrains of dimensional change at the strain gages for each 10,000, pounds per square inch of bending stress. If the rated capacity of the load cell is based on 1,000 microstrains at the gages, then a high alloy aluminum load cell of 7075-T6 material can be stressed to 600 percent of rated capacity at its material tensile strength of approximately 60,000 psi. Whereas a steel load cell of a high grade material may have a tensile strength of 120,000 psi, a rated load creating 1,000 microstrains at the gages on a steel beam requires 30,000 psi of bending stress, and the overload is limited to only 400 percent of rated capacity.

This difference between steel and aluminum stems from the fact that strain E, which is what the strain gages measure, is equal to the stress S divided by the modulus of elasticity E, as: $E = S/E$. For steel $Es = 30,000,000$ psi, and for aluminum $EA = 10,000,000$ psi, where a strain $e - 1,000 \times 10^{-6}$ in/in is desired as a nominal strain under a rated capacity load. Thus, for practical purposes, aluminum load cells generate a gage output signal equal to that from steel load cells, but at lower stress levels. As a result, the aluminum cells have an ultimate safe overload of 600% compared to only 400% for steel.

Moreover, the ability of a load cell to recover to its original no-load condition is critical. In steel, the elastic limit of 120,000-psi-tensile steel is in the order of 72,000 psi. Therefore, a steel load cell can be loaded to a stress of 72,000 psi, which is 240 percent of rated capacity stress, and the steel will still recover to original state when the load is removed.

Aluminum of the 7075-T6 type has an extremely desirable characteristic—for load cell work—in that its tensil strength and elastic limits are both substantially equal to 60,000 psi. Therefore, the aluminum cell will remain elastic and will recover to original no-load condition after application of a load equal to 600% of rated capacity, which is far superior to the nominal 240% elastic overload limit for steel. But the aluminum material does not have good resistance to wear at the bearing surface.

It is therefore critical to tightly clamp the aluminum element between steel members 28 and 34 in order to minimize movement and wear, and to utilize the upper surface 30 as the bearing wear surface at which loads are introduced.

Figure 5:
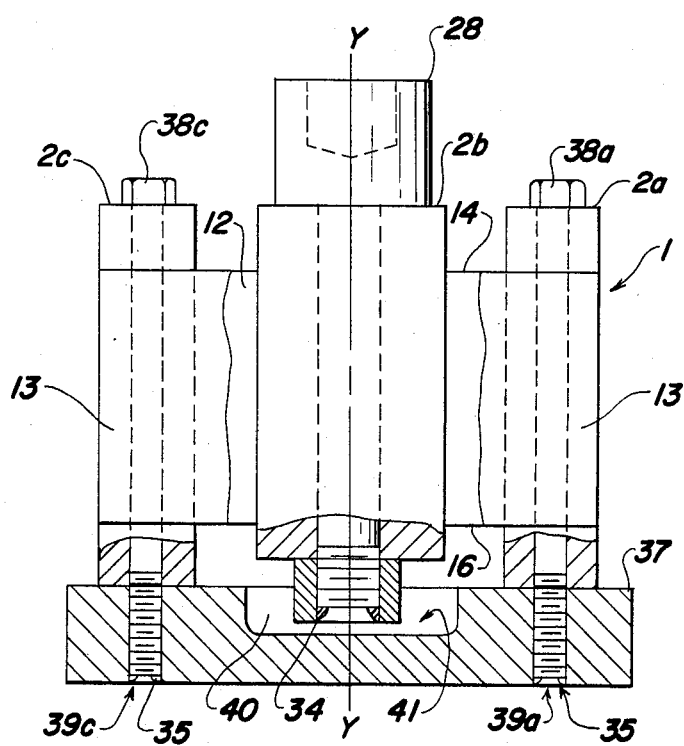
FIG. 5 is an end elevational view, parts being broken awy to illustrate side bolts.

FIG. 5 shows side bolts 38a and 38c engaging threaded holes 39a and 39c of base plate 37. A counterbore 40 creates a cavity in plate 37 to provide a clearance gap 41 and avoid interference with deflection of nut 34. The lower ends of side bolts 38a and c are welded at 35 to create a clamping action between the bolt heads and plate 37 to firmly anchor element 1 in the manner described above for assembly to center post 28 and nut 34.

Figure 6:
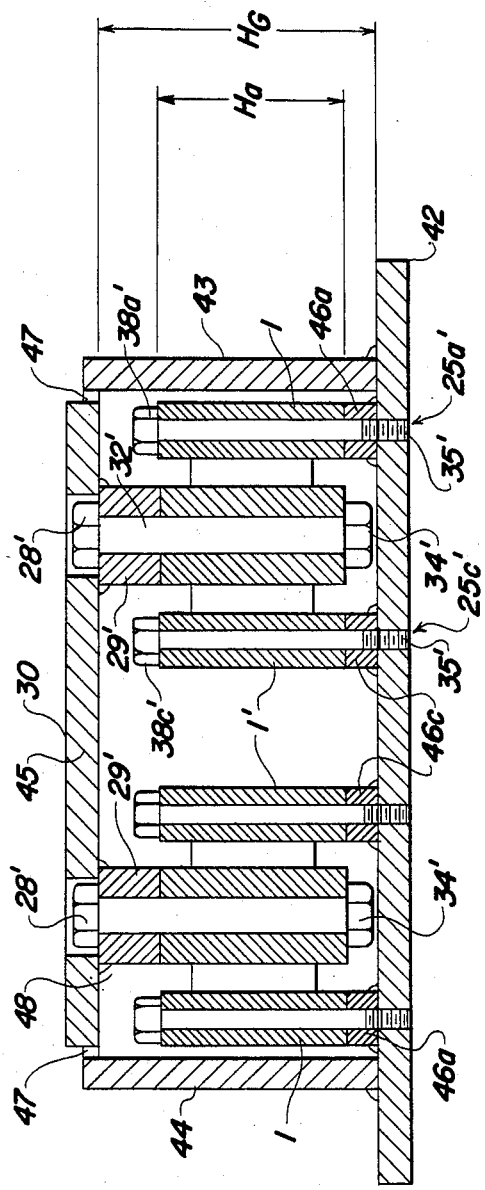
FIG. 6 is a cross sectional view through a housing having a pair of load elements mounted therein.

FIG. 6 shows a sectional view of a housing comprising base 42, side walls 43 and 44, a load receiving plate 45 and spacer blocks 46a, 46a, 46c and 46c.

Load receiving plate 45 serves as a top cover of the housing, being sealed to side walls 43 and 44 by means of resilient sealant material 47. Material 47 may be a rubberized gasket, an RTV material which is grouted in place, or any other suitable resilient material. Two or more load cell elements 1 support the load receiving plate 45. Load members 29' take the place of the center post cylinder 29 in transferring forces into load element 1. Bolt 28' is a substitute for center post 28 and nut 34' is welded to bolt 28' to accomplish the welded assembly earlier described.

Air is trapped in the space 48 of FIG. 6. If the air is sealed in the space and the vertical motion of plate 45 is relatively small, a 70° F. increase of ambient temperature would cause a pressure increase, inside the housing, substantially equal to one atmosphere, or approximately 14.7 psi. Such a pressure is intolerable when acting on a large area of plate 45 equal to, for example, 400 inches. An apparent negative load of approximately 5,880 pounds would be sensed when no real load is on the cell structure. If the air were vented, then moisture could contaminate the strain gages 901, 902, 903 and 904. Therefore, air insulating grease having a low thermal expansion coefficient is provided in the space 48, and flexible seals 47 allow for sufficient expansion of the grease.

For example, if a plate of 400 inches were resting on a 6 inch column of grease and the temperature increased 70° F., where the grease has a thermal expansion coefficient of 0.000009 in/in/° F., the height of the grease column would tend to increase by:

$$6 \text{ in} \times 70° \text{ F.} \times 0.000009 \text{ in/in/° F.} = 3780 \times 10^{-6} \text{ in,}$$
or 0.00378 inch.

A 0.00378-inch rise over 400 inches $^2$ = 1.52 in$^3$. Thus, allowing of the flexible seal 47 resiliency to accommodate 1.52 cubic inches of expansion, in total, around the periphery of the plate 45 will relieve pressure due to a temperature change of 70° F.

Figure 7:
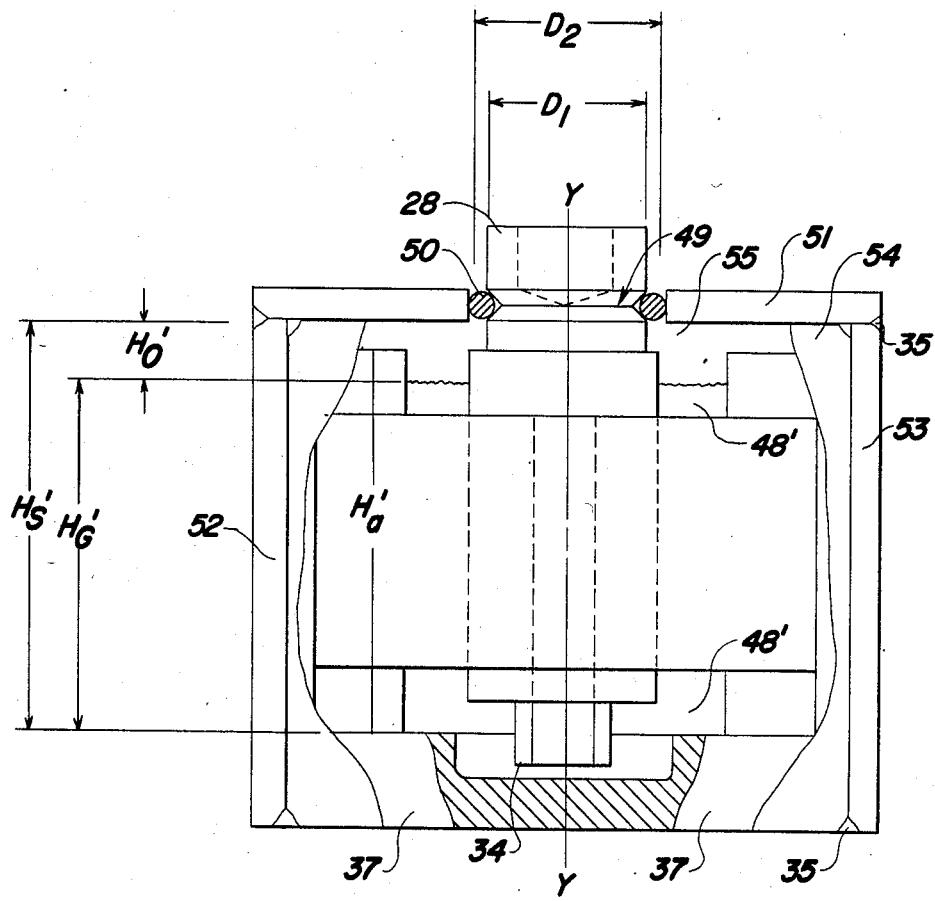
FIG. 7 is a fragmentary cross sectional view of a second embodiment of a housing having a single load unit mounted therein.

Another form of load cell enclosure is shown in FIG. 7, where most of the housing top is formed by rigid cover member 51. Weight-sensitive center post 28 is provided with a groove 49 and resilient O-ring 50. The height H'G of grease 48' is less than the height H's of steel housing, so that an air space of height H'o is present. As shown before, a temperature rise of 70° F. will increase the pressure of entrapped air by approximately 14.7 psi.

Figure 8:
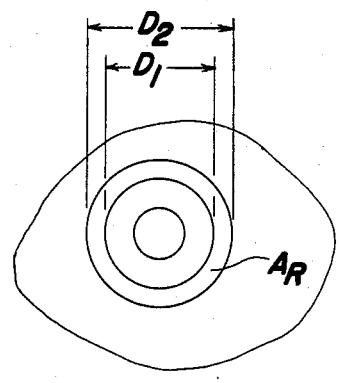
FIG. 8 is a fragmentary top elevational view of the top of a housing, a center post and O-ring seal.

As shown in FIG. 8, the area $A_R$ filled by the resilient O-Ring 50 equals:

$$A_R = D_2^2 - D_1^2/4$$

Aluminum load element 1 will be subjected to a vertical expansion equal to 70° F. $\times$ 0.000013 in/in/°F. $\times$ Ha$_1$ where Ha is the height of aluminum. Similarly, the steel housing will expand by 70° F. 0.000006 in/in/°F. $\times$ Hs, where Hs is the height of the steel. Since heights Ha and H$_s$, in this case, are the same, the aluminum will want to expand more than the steel by a value:

$$H_a = (70° \text{ F.})(0.000013 - 0.000006 \text{ in/in/°F.}) \text{ H}_a \text{ z}$$
0.000490 H$_a$.

Suppose that aluminum height H$_a$ = 1 inch, so that the expansion due to 70° F. temperature increase is Ha = 0.000490 inch. Also suppose that a vertically downward applied load Py on the load cell, equal to 10 pounds of force, will produce a downward deflection in the aluminum element equal to 0.000490 inch. Thus, if the steel housing acted to restrain the upward expansion of aluminum element 1, an erroneous reading of 10 pounds of downward force would result.

The area $A_R$, being sensitive to internal air pressure, is therefore made—in this case—to equal 0.6803 in$^2$, so that an upward pressure on O-ring 50 will translate into an upward force equal to:

$$0.6803 \text{ in}^2 \times 14.7 \text{ lb/in}^2 = 10 \text{ lbs.}$$

As a result of the relationship in size of area AR to thermal expansion coefficients of the housing and load element, the downward resistance of the steel cover 5' is reacted by the upward push of air pressure on O-Ring 50.

In a like manner, the area $A_R$ can be adjusted to accommodate pressure gradients caused by upwardly directed internal pressure under an area equal to D$^2$/4 being greater than downwardly external pressure acting on a like area atop center post 28. By designing the proper ratio of steel height Hs to aluminum height Ha, and designing the size of area $A_R$ relative to the combined effects of different coefficients of expansion, the entrapped air can be used as a thermal equalizer for overcoming expansion gradients between dissimilar materials.

Figure 9:
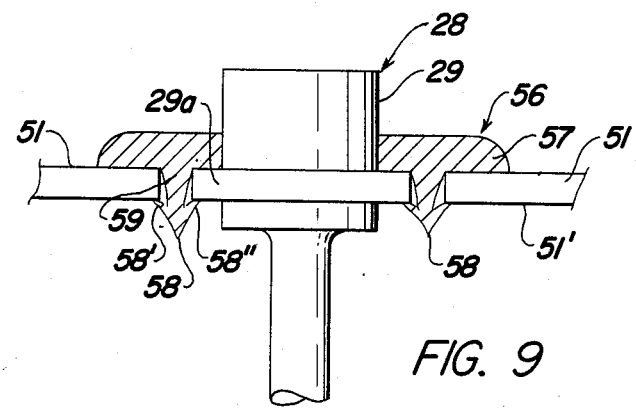
FIG. 9 is a fragmentary cross sectional view illustrating the relationship of a center post having a flange mounted thereon and a resilient gasket.
Figure 10:
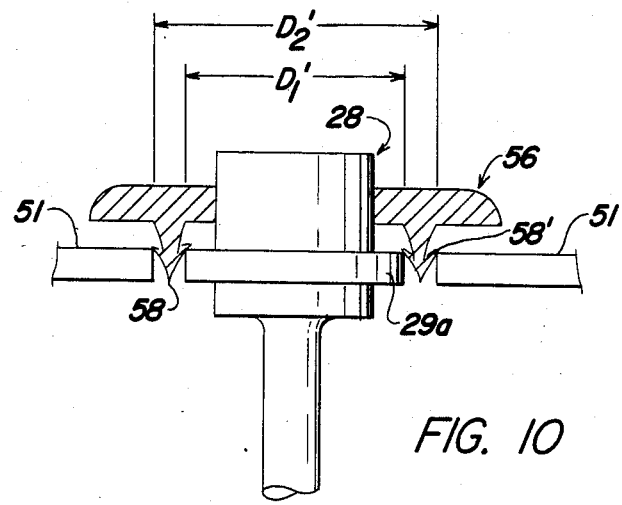
FIG. 10 is a fragmentary elevational view similar to FIG. 9 illustrating a modified form of the resilient gaskets.

In FIG. 9, center post cylinder 29 has been provided with a flange 29a. Area $A_R$ is equal to (D$_2^2$ − D$_1^2$)/4. A molded resilient gasket 56 has an outer seal portion 57 and an inner seal portion 58. It can be seen that an increase of internal pressure will cause portion 58 to more tightly press its flanges 58' and 58" against the bottom surface 51' of housing 51. Conversely, an increase in enter pressure will cause outer portion 57 to more tightly seal against the upper surface of housing 51. Connecting gasket portions 57 and 58 is a stem portion 59 which is tapered to facilitate insertion of the gasket, as shown in FIGS. 9 and 10.

Figure 10A:
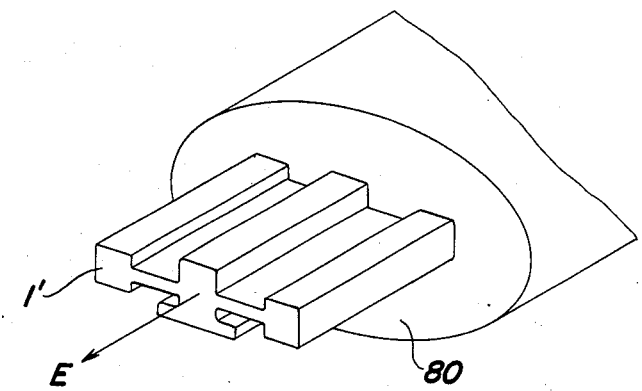
FIG. 10A is an isometric view of a die and aluminum extrusion.

In FIG. 10A is shown an isometric view of an aluminum strip 1' being extruded through a die 80, with movement in the direction E as shown, Direction E corresponds to axis X—X of other figures of this disclosure.

Figure 10B:
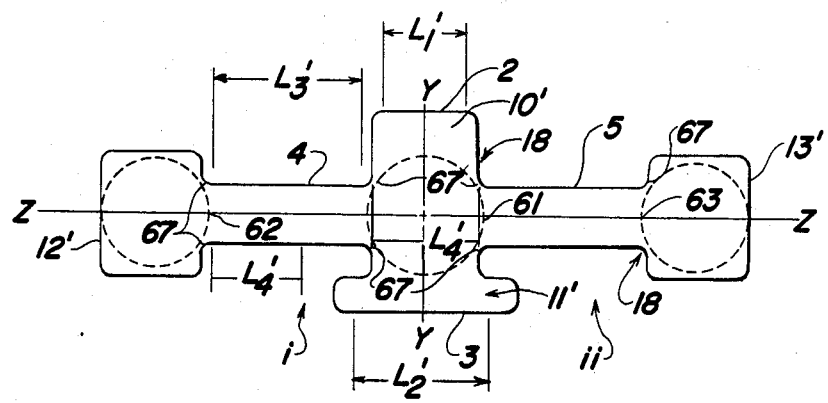
FIG. 10B is a cross sectional view of the aluminum extrusion.

FIG. 10B shows a cross-section of extruded strip 1' in which it is obvious that the extruded shape provides partially shaped, partially finished material for fabrication of load element 1.

It is characteristic of the extrusion process that the maximum strength of the material will be found within an area encompassed by the largest circle that can be inscribed. In FIG. 10B, the largest inscribed circle is shown as circle 61. As the material flows through lesser size openings in the die, the material grain structure will become more non-uniform as the distance from inscribed circle 61 increases. Therefore, enlarged cross-sectional areas are provided at ends 12' and 13' to allow for inscribed circles 62 and 63, which are each approximately ½ the area of circle 61. Thus, while circle 61 acts to strengthen the innermost portion of both beam portions 4 and 5, circles 62 and 63 each acts to strengthen the outermost portion of each beam portion 4 and 5.

It is noted that, even though upper central thickened portion 10' is not symmetrical with lower central thickened portion 11' about axis Z—Z, the inscribed L circle 61 has its center along axis Z—Z so that the strength of beam portion material is symmetrical about axis Z—Z.

In the above manner, the material strength of beam portion 4 at one extremity of length L'3 adjacent circle 62 is substantially equal to the strength at the beam portion 4 at its other extremity of length L'3 adjacent circle 61. Since, as shown in FIG. 1, the strain gages 901 and 903 are attached at these extremities, each of the two gages will be subjected to substantially uniform bending strain for the same stress. Gages 902 and 904 on beam portion 5 are treated in the same manner.

Any loss in uniformity of grain structure, which may occur when relatively long beam portions 4 and 5 are used, will tend to occur near points i and ii of portions 4 and 5, which points i and ii are points of inflection subject to zero bending stress.

Figures 11A, 11B:
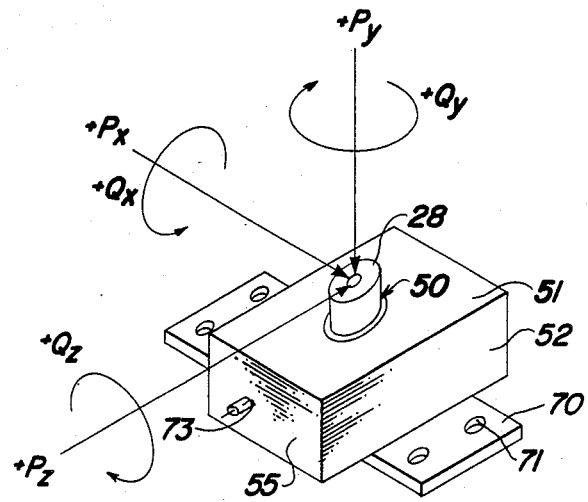
FIG. 11A is a force diagram.
FIG. 11B is a diagrammatic view of an instrument panel illustrating instruments displaying magnitudes of forces in X, Y and Z directions and torque about X, Y and Z axes.

FIG. 11A is a force diagram showing downward force vector Py applied to surface Z of element 1 along axis Y—Y, and reacted by an upward force Py on surface 3.

Figure 12:
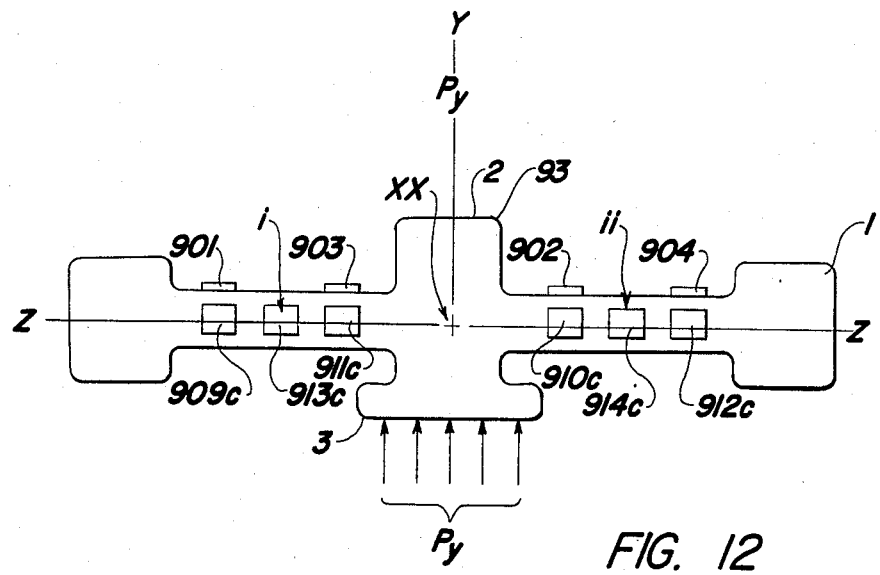
FIG. 12 is a side elevational view similar to FIG. 1 illustrating strain gauges attached to side surfaces of the load element.
Figure 13:
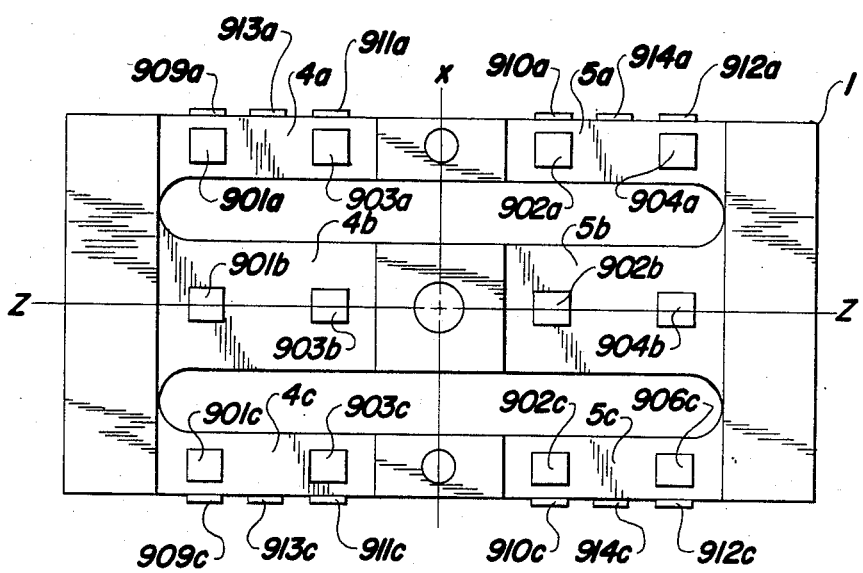
FIG. 13 is a top plan view of the load element illustrated in FIG. 12.
Figures 14, 15:
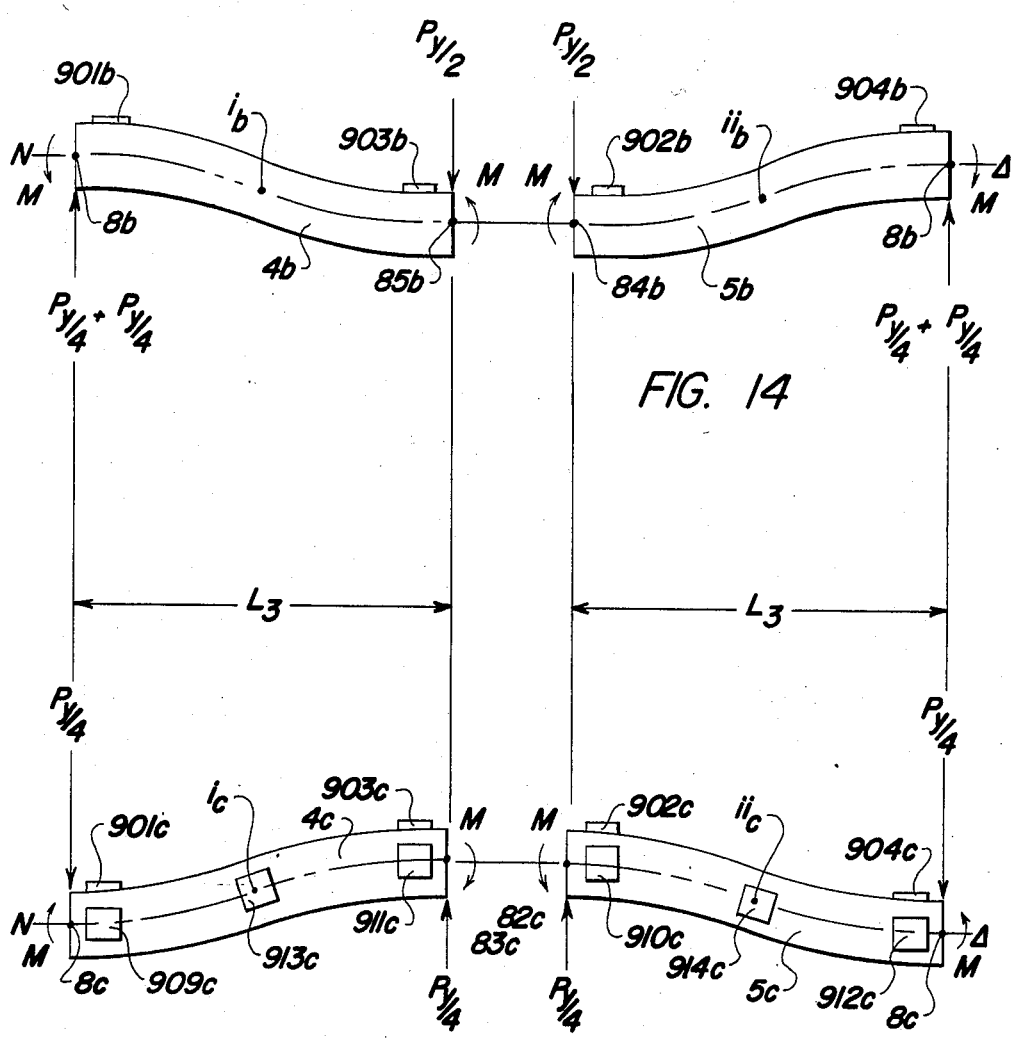
FIGS. 14 and 15 are free body diagrams of beam portions.

As shown in FIGS. 12 and 13, 24 strain gages are attached to element 1. FIG. 14 shows beam portions 4b and 5b as free bodies, subjected to bending moments M as a result of application of a total force Py. FIG. 15 shows one side beam portion 4c and one side beam portion 5c under the same load condition as that of FIG. 14. Another pair of side beams 4a and 4c are symmetrically disposed about the Z—Z axis, but not shown here.

Three force vectors Py, Px and Pz and three torque forces Qy, Qx, and Qz are shown in FIG. 15. A mounting plate 70 has been added, and holes 71 have been provided, for securing the load cell to a rigid foundation. All vector and torque forces are shown in the positive direction according to a convention established for this disclosure. Any vector or torque force acting in a direction opposite to those of FIG. 15 is considered to be in a negative direction.

The FIGS. 16 through 21 show the combinations in which strain gages are connected into six independent wheatstone bridges for independently measuring the six different forces Py, Px, Pz, Qy, Qx and Qz.

Figure 16:
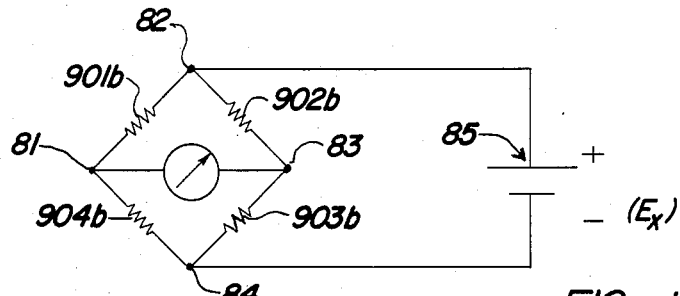
FIGS. 16–21 are schematic views of combinations of strain guages connected into six independent wheatstone bridges for independently measuring force along X, Y and Z axes and torque about X, Y and Z axes with an accompanying table.
Figure 18:
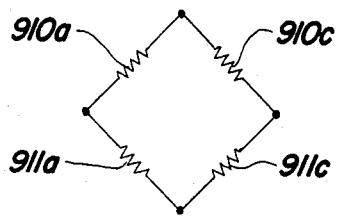
Figure 17:
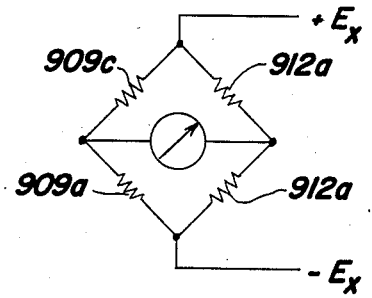
Figure 19:
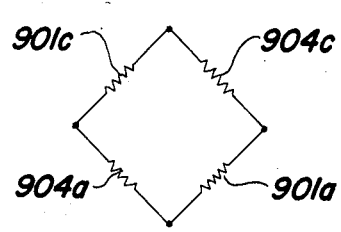
Figure 20:
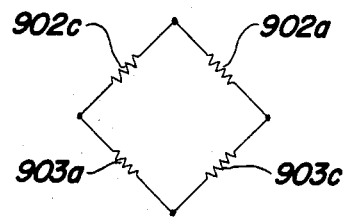
Figure 21:
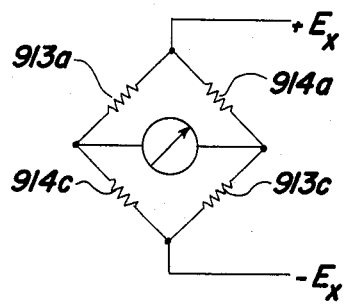
Figure 22:
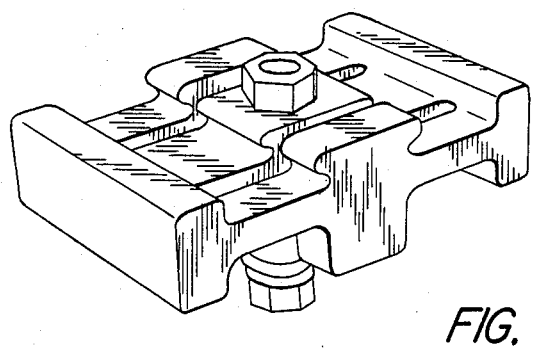
FIG. 22 is a bottom perspective view of the load unit.
Figure 23:
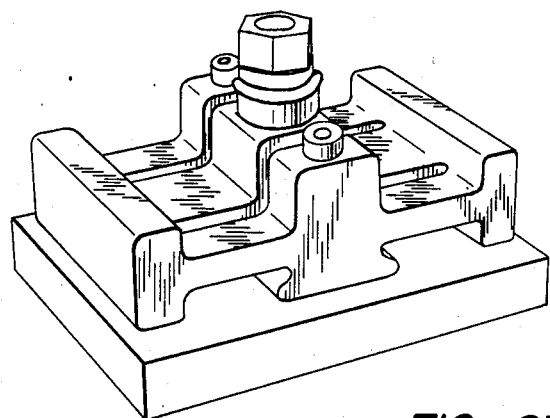
FIG. 23 is top persepective view thereof.

In FIG. 16, strain gages 901b, 902b, 903b and 904b have been connected to form a wheatstone bridge at terminals 81, 82, 83 and 84. A power source, as for example, battery 85 provides an excitation voltage. Output signal from the bridge is indicated by a readout means, as for example, dial indicator 86.

The sensing of force Py by the strain gages 901b, 902b, 903b and 904b is described in detail in the prior art cited above. A tabulated presentation is made under FIG. 16, however, to graphically display the insensitivity of the gages in FIG. 16 to any force other than force vector Py.

In the table, one unit of strain for a rated capacity load +Py equals +(T) for tension on two gages and +(C) for compression on two other gages which, when added, provides a total signal equal to +4 units of output.

In some cases, individual gages do not see any strain from forces other than vector Py, because the gages are on the neutral axis or neutral plance which are the line or plane of zero stress.

In a like manner, FIGS. 17 through 21 show the arrangement of strain gages in wheatstone bridges to measure only one desired and selected force.

In describing the construction of the load cell element and housing using two dissimilar materials, I have used steel and aluminum only by way of example. Other metals, such as brass, may be used and plastics may be used where appropriate to the intended use.

Joining of parts by welding is shown for shrink-attachment of steel to steel, but other means, such a high shrinkage adhesives, may be used for joining other materials where high strength in low capacity load cells is not required.

Although none of the figures shows an output cable or electrical path through the housing to the outside environment, hermetically sealed through-the-wall connectors (such as "Swageloc") are readily available.

What is claimed is:

1. In a force sensitive structural element, a pair of parallel side faces spaced apart by a desired width such that said width includes the width of one middle portion, the width of two side portions and the width of two slots, whereby the width of each of said side portions is equal to one-half the width of said middle portion; a pair of mounting holes in said side portions and a load securing hole in said middle portion; a center post stem extending through said load securing hole, said center post stem having threads at its lower end; a center post cap on said stem; a center post nut secured to the said threads; and welds disposed within the internally threaded portion of said nut at an elevation coincidental with the lower end surface of the said stem, so that any shrinkage of said weld tends to pull said stem deeper into said nut.

2. A force sensitive structural element according to claim 1, in which said middle portion is constructed of material which is different from the material of which said center post stem and nut are constructed.

3. A force sensitive structural element according to claim 2, with the addition of a base plate; a pair of side bolts passing through said pair of mounting holes in said side portions and into a pair of threaded holes in the said base plate; and welds within said threaded holes in said base plate to secure said bolts such that any weld shrinkage tends to pull said bolts deeper into said threaded holes.

4. A force sensitive structural element according to claim 3, said side bolts and said base plate being constructed of a material which is different from the material of which said middle and side portions are constructed.

5. A force sensitive structural element according to claim 3 with the addition of means for measurement and readout of structural deflection which occurs when forces are applied to the said force sensitive structural element.

6. A force sensitive structural element according to claim 1, said element comprising: a thickened. middle portion and a pair of thickened side portions, a pair of beam portions disposed so that each of said thickened side portions is connected by said beam portions to said thickened middle portion, said beam portions having a uniform depth which is substantially less than the depth of said middle and side portions, so that the cross sectional area of the largest circle which may be inscribed in the thickness plane of each of said thickened side portions is equal to substantially one-half of the area of the largest circle which may be inscribed in the thickness plane of said thickened middle portion, said thickness planes being parallel to said side faces.

7. A force sensitive structural element according to claim 6, in which the center of each of the inscribed circles is located at an elevation which lies half way between the top and bottom of said beam portions.

8. A force sensitive structural element according to claim 7, in which the lower portion of said thickened middle portion is tangent to and disposed below the largest central circle which may be inscribed in the thickness plane of said thickened middle portion, and said lower portion is substantially wider than the load bearing length of the upper portion of said thickened middle portion which is tangent to and disposed above said central inscribed circle.

9. A force sensitive structural element according to claim 1, said parallel side faces, middle portion and side portions comprising: an extrusion.

10. A force sensitive structural element according to claim 9, said extrusion being formed of aluminum.

11. In a strain gage load cell, a force sensitive structure; a base plate; means connecting said structure to said base plate; a housing connected to said base plate but spaced from the force sensitive structure; a load receiving member supported by said force sensitive structure; resilient seal means between said housing and said load receiving member; insulating grease disposed within said housing to act as an electrical insulation and some amount of air entrapped within the said housing, wherein the height and co-efficient of thermal expansion of the material of said force sensitive structure is selected relative to each of the height of said housing, the coefficient of thermal expansion of said housing, and the plan view area of the said resilient seal means, so that variable magnitudes of expansion of the diverse material tends to collectively cancel the internal barometric effects of thermal changes acting on the force sensitive structure.

12. A strain gage load cell according to claim 11 wherein said load receiving member comprises a cylindrical load receiving center post secured to said force sensitive structure, said resilient seal means comprises an annular top portion for engaging the cylindrical wall of the center post, and annular stem portion for penetration of the air space between said center post and said housing, and an annular tapered and flange portion disposed below and locking onto the inside surface of said housing.

13. A load cell according to claim 11, said force sensitive structure comprising: a thickened central portion and a pair of thickened end portions, a pair of beam portions disposed so that each of said thickened end portions is connected by said beam portions to said thickened central portion, said beam portions having a uniform depth which is substantially less than the depth of said central and end portions, so that the cross sectional area of the largest circle which may be inscribed in the thickness plane of each of said thickened end portions is equal to substantially one-half of the area of the largest circle which may be inscribed in the thickness plane of said central thickened portion.

14. A load cell according to claim 13, in which the center of each of the inscribed circles is located at an elevation which lies half way between the top and bottom of said beam portions.

15. A load cell according to claim 14, in which all of the lower portion of said thickened central portion is tangent to and disposed below the largest circle which may be inscribed in the thickness plane of said central thickened portion, and said lower portion is substantially wider than the load bearing length of the upper portion of said central thickened portion which is tangent to and disposed above said central inscribed circle.

16. A strain gage load cell according to claim 11, said force sensitive structure comprising: an extrusion.

17. A strain gage load cell according to claim 16, said extrusion being formed of aluminum.

18. In a strain gage load cell, a force sensitive structure; a base plate; means connecting said structure to said base plate; a housing connected to said base plate but spaced from the force sensitive structure; a load receiving member supported by said force sensitive structure; and resilient seal means between said housing and said load receiving member, said force sensitive structure comprising, a strip of high strength aluminum alloy having a cross section including a thickened central portion and a pair of thickened end portions, a pair of beam portions disposed so that each of said thickened end portions is connected by said beam portions to said thickened central portion, said beam portions having a uniform depth which is substantially less than the depth of said central and end portions, so that the cross sectional area of the largest circle which may be inscribed in the thickness plane of each of said thickened end portions is equal to substantially one-half of the area of the largest circle which may be inscribed in the thickness plane of said central thickened portion; strain gages secured to said beam portions; and an electrical circuit connected to said strain gages and producing electrical signals related to the magnitude of force applied to said thickened central portion.

19. As in claim 18, in which the center of each of the inscribed circles is located at an elevation which lies half way between the top and bottom of said beam portions.

20. As in claim 19, in which all of the lower portion of said thickened central portion is tangent to and disposed below the circle inscribed in said central beam portion, and said lower portion is substantially wider than the load bearing length of the upper portion of said central thickened portion which is tangent to and disposed above said central inscribed circle.

* * * * *